Patented Apr. 7, 1942

2,278,987

UNITED STATES PATENT OFFICE 2,278,987

COMPOUNDS OF THE DIBENZANTHRONE SERIES

Donald P. Graham, Wilmington, Del., assignor to E. I. du Pont de Nemours & Company, Wilmington, Del., a corporation of Delaware No Drawing. Application November 22, 1940, Serial No. 366,699

3 Claims. (Cl. 260—355)

This invention relates to compounds of the dibenzanthrone series and more particularly to the mono-sodium salt of dihydroxydibenzanthrone and to a process for preparing the same in a crystalline form which is stable under ordinary conditions.

Dihydroxydibenzanthrone is a valuable dyestuff intermediate employed in the preparation of the alkyl and other organic ethers of dibenzanthrone. Ordinarily dihydroxydibenzanthrone is prepared at the time it is used for it is not stable in contact with air. It is usually produced by treating dioxo-dibenzanthrone with sodium bisulfite, the dioxo-dibenzanthrone being formed by the oxidation of dibenzanthrone as more particularly described in U. S. P. 1,910,603. The dihydroxydibenzanthrone prepared as described in the above mentioned patent is readily reacted with dimethyl sulphate to produce the dimethoxydibenzanthrone but if it is allowed to stand for any extended period of time superficial oxidation occurs and it is no longer suitable for methylation until it has again been reduced to the dihydroxy form.

The disodium salt of dihydroxydibenzanthrone has been produced by the processes described in U. S. P. 1,950,366 and U. S. P. 1,957,547, but these products are not stable, being readily hydrolyzed with water, which prevents their isolation free from an excess of alkali.

It is an object of the present invention to prepare dihydroxydibenzanthrone in the form of the crystalline mono-sodium salt which is very stable under ordinary conditions and which can be readily alkylated with dimethyl sulphate or other alkylating agents even after standing for long periods of time.

It is a further object of the invention to provide a process for producing a stable reactive sodium salt of dihydroxydibenzanthrone.

I have found that a crystalline monosodium salt of dihydroxydibenzanthrone which is stable under ordinary conditions and which is not readily hydrolyzed with water at ordinary temperatures can be produced by the slow oxidation of a sodium hydroxide solution of the leuco derivative of dihydroxydibenzanthrone at temperatures of from 80 to 100° C., preferably at temperatures above 88° C.

The following examples are given to illustrate the invention. The parts used are by weight:

Example 1

Fifty parts of dioxo-dibenzanthrone, obtained by oxidation of dibenzanthrone with manganese dioxide as disclosed in U. S. P. 1,910,603, are slurried in 3400 to 4000 parts of water at 55–60° C. in a vitreous lined vessel. Seventy-five parts of sodium hydroxide and 90 parts of sodium hydrosulfite are added and the charge vatted for ½ hour at 60–65° C. Fifteen parts of "Filter-Cel" or other diatomaceous earth filter aids are then added and the vat filtered. The filtrate is heated to 90–95° in a non-metallic vessel and oxidized by stirring in contact with air at that temperature. When the vat is oxidized (as evidenced by a spot test or by the bright green color of the suspension) the slurry is filtered and the cake washed free of the mother liquor and substantially alkali free with distilled water at room temperature. The product is a mass of needles brownish-olive in color by transmitted light and bright green in color by reflected light. Analysis indicates the product to be the mono-sodium salt of Bz-2:Bz-2'-dihydroxydibenzanthrone.

Example 2

150 parts of dihydroxydibenzanthrone are slurried in 4000 parts of water at 60° C., 80 parts of sodium hydroxide and 90 parts of sodium hydrosulfite are added. The slurry is heated to 90°, filtered on a cake of "Filter-Cel," and the cake washed with a solution of 20 parts of sodium hydroxide and 20 parts of sodium hydrosulfite in 2000 parts of water at 90° C. The combined filtrate and wash liquor are agitated at 90–97° C. until oxidation is complete. It is then filtered, and washed alkali-free. The product is the same as that of Example 1.

Example 3

180 parts of dioxo-dibenzanthrone are slurried in 7000 parts of water with 80 parts of zinc dust and heated to 95° C. At 95–100° C. during 1½ hours, a solution of 200 parts of sodium hydroxide in 1000 cc. of water is added drop by drop. The charge is held at 97° C. to boiling for 30 minutes and then filtered. The filtrate is oxidized by aeration at 90–95° C. yielding a crystalline product similar to that of Example 1.

As illustrated in the above examples the alkalinity of the vat from which the mono-sodium salt of the dihydroxydibenzanthrone is produced may vary over a wide range but it has been found that the temperature limits during oxidation with air or oxygen containing gases should be above 80° C. and preferably from 88–100° C. to obtain a completely crystalline product.

Where a very impure dibenzanthrone or dihydroxydibenzanthrone is used as the starting material some non-crystalline material is present in the mono-sodium salt, so that for the best results a relatively pure starting material should be employed.

The mono-sodium salt of the dihydroxydibenzanthrone as above produced is a highly crystalline compound which does not hydrolyze when it is washed with water under ordinary conditions at room temperatures and which is readily reacted with alkylating agents such as dimethyl sulphate, the methyl ester of para-toluene sulfonic acid or other alkylating agents. It retains its reactivity over long periods of time, samples of the product stored for several years having retained their crystalline form and reactivity unimpaired.

I claim:

1. The mono-sodium salt of Bz-2:Bz-2'-dihydroxydibenzanthrone which is a highly crystalline product said crystals being in the form of long needles which are brownish-olive in color by transmitted light and which are bright green in color by reflected light, said product being stable against hydrolysis on being washed with cold distilled water until it is substantially alkali free and which is reactive to alkylating agents after being stored for long periods of time.

2. The process for preparing the mono-sodium salt of Bz-2:Bz-2'-dihydroxydibenzanthrone which comprises slowly oxidizing an aqueous sodium hydroxide solution of the leuco derivative of Bz-2:Bz-2'-dihydroxydibenzanthrone at temperatures of from 80 to 100° C.

3. The process for preparing a highly crystalline sodium salt of Bz-2:Bz-2'-dihydroxydibenzanthrone which comprises slowly oxidizing a sodium hydroxide solution of the leuco derivative of Bz-2:Bz-2'-dihydroxydibenzanthrone with air at temperatures of from 88 to 100° C.

DONALD P. GRAHAM.